United States Patent [19]

Frankfurth et al.

[11] 3,817,498
[45] June 18, 1974

[54] EXTRUSION PRESS FOR PROCESSING VISCOUS MATERIALS, ESPECIALLY CLAY OR CLAY-LIKE MATERIALS

[75] Inventors: Gunther Frankfurth, Konstanz, Germany; Werner Wieser, Kreuzlingen, Switzerland; Rainer Handle, Konstanz, Germany

[73] Assignee: Rieter-Werke Dipl-Ing. Walter Handle GmbH, Konstanz, Germany

[22] Filed: Jan. 8, 1973

[21] Appl. No.: 322,025

[30] Foreign Application Priority Data
May 3, 1972 Switzerland.................. 6545/72

[52] U.S. Cl................ 259/192, 198/128, 259/193, 259/6, 259/41, 425/202
[51] Int. Cl................................. B01f 7/08
[58] Field of Search.......... 259/191, 192, 193, 187, 259/188, 9, 10, 25, 26, 6, ; 198/128; 241/3, 86, 86.1; 425/202, 206

[56] References Cited
UNITED STATES PATENTS

| | | | |
|---|---|---|---|
| 2,640,033 | 5/1953 | Marshall | 259/193 |
| 2,755,509 | 7/1956 | Smidth | 241/3 |
| 2,868,143 | 1/1959 | Strahmann | 259/193 |
| 3,592,394 | 7/1971 | Sinden | 198/128 |
| 3,643,873 | 2/1972 | George | 241/3 |

Primary Examiner—Robert W. Jenkins
Attorney, Agent, or Firm—Werner W. Kleeman

[57] ABSTRACT

An extruder for processing viscous materials, especially suitable for the processing of clay or clay-like materials, comprising a housing having an inlet opening and an outlet opening, at least one revolving conveyor element arranged in said housing. The conveyor element is provided at its periphery with a number of projections which are distributed over its length, said projections traveling in the peripheral direction and having the same height, and said projections extending almost up to the inner wall of the housing along at least a part of their peripheral movement. A scraper element is arranged at the outlet opening for engaging into the intermediate spaces between the projections and said projections having a greater spacing from one another at the central region of the conveyor element than at the outer regions thereof. There can also be provided a further revolving conveyor element cooperating with the first revolving conveyor element, said further revolving conveyor element likewise being provided at its peripheral surface with projections of the same height and which travel in the peripheral direction.

37 Claims, 7 Drawing Figures

EXTRUSION PRESS FOR PROCESSING VISCOUS MATERIALS, ESPECIALLY CLAY OR CLAY-LIKE MATERIALS

BACKGROUND OF THE INVENTION

The present invention relates to a new and improved construction of extrusion press or extruder for processing viscous materials, especially clay or clay-like materials, and is of the type incorporating a revolving conveyor element arranged in a housing possessing an inlet opening and outlet opening, the conveyor element exhibiting at its periphery a number of projections having the same height which extend in the peripheral direction of the conveyor element and are distributed over its length. These projections extend along a portion of the peripheral path practically up to the region of the housing wall, and wherein at the outlet opening there is arranged a scraper element which engages with the intermediate spaces between the projections.

SUMMARY OF THE INVENTION

An extruder of the aforementioned general type is already known to the art. It is a primary object of the present invention to improve upon such prior art construction of extruder.

Hence, the invention contemplates arranging the projections at the central region of the conveyor element so as to have a greater spacing from one another than at the outer regions and/or providing a further revolving or rotating conveyor element which cooperates with the first rotating conveyor element, and wherein such further conveyor element is likewise provided at its peripheral surface with projections of the same height which travel in the peripheral or circumferential direction of the associated conveyor element.

Since the projections of a conveyor element possess at the central region thereof a greater spacing from one another than at the external regions there is surprisingly produced a more uniform structure in the extruded strand or product.

Depending upon the given conditions, that is to say upon the size of the strand which is to be extruded and the material to be processed, it can be advantageous to permit the spacing of the projections to gradually decrease from the center of the conveyor element towards the external region. The magnitude of the change of the spacing of the projections is dependent both upon constructional considerations of the extruder as well as upon the nature of the material to be processed. The spacing of the projections at the central region of the conveyor element can be, for instance, 2.5-times the spacing of the projections at the outer regions. Preferably, the spacing of the central projections amounts to 1.5-times the spacing of the projections at the outer regions.

The extruder is advantageously designed such that the projections are formed by projection segments arranged upon a support and separated fron one another by segment-shaped spacer elements. The spacer elements and the projection segments are advantageously exchangeable and interchangeable. Consequently, it is readily possible to exchange individual projection segments which have become worn. Also it is thus readily possible to re-equip the conveyor element when processing a different material. The segments are advantageously retained together by a clamping mechanism. Due to the arrangement of a further rotating conveyor element it is possible to improve the capacity or output of the extruder while retaining a relatively small constructional size.

The conveyor element or conveyor elements can be designed in a band-like fashion or preferably in a drum-like fashion. When using two conveyor elements they can be paired with one another in different ways. Preferably, however, the same type of conveyor elements are coupled with one another, for instance two band-type or two drum-type conveyor elements. Paired conveyor elements can feed the product to a common outlet or discharge opening or to two different outlet openings. In the first case it would be possible, if desired, to dispense with the use of scraper elements for each conveyor element, wherein one conveyor element functions as the scraper element for the other conveyor element.

The scraper element or scraper elements are advantageously designed in a comb-like fashion incorporating claws which extend between the projections. If desired, the scraper elements should also be revolving or rotating components and can possess projections which engage into the intermediate spaces between the projections of the associated conveyor element.

The scraper element is advantageously adjustable with respect to its penetration depth between the projections. As a result, the scraper element cannot only be accommodated to the individually conveyed materials, rather it can particularly also be re-adjusted when it has become worn. It is furthermore particularly advantageous if the scraper element is assembled together from individual exchangeable claws or projections and spacer elements, which are retained together by means of a clamping mechanism. This not only facilitates exchange of a worn claw or projection but also re-equipping a scraper element when there is desired a different arrangement of the projections at the conveyor element.

The sides of the conveyor elements are preferably sealed by means of a sealing device, preferably a labyrinth seal towards the housing, to prevent the escape of material. In this way there is not only prevented contamination or soiling of the housing, but also the extrusion pressure can be maintained at a certain value. Further, in order to prevent that material which has possibly escaped penetrates into the housing there is preferably provided a device for returning back into the inlet opening material which has penetrated through the seal.

It is furthermore of particular advantage to equip the housing at a compartment or recess which accommodates the conveyor element with an exchangeable lining so that in the case of wear it is only necessary to exchange such lining.

The quality of the extruded material or strand can be increased if, according to a preferred exemplary embodiment of the invention, there is provided a suction device for evacuating the inlet side of the extruder.

Moreover, through the arrangement of an upstream or forwardly connected pre-extruder it is possible to improve upon the quality of the extruded strand or extrusion. Such not only brings about a pressure increase but also serves for agitating or admixing the material. Particularly good results can be realized if the forwardly arranged pre-extruder is of the same type as the main extruder. In this case it is advantageous if the suction device which may be provided engages with a connection channel interposed between the pre-extruder and the main extruder.

Since the conveyor element for maintenance or for re-equipping the projections must be eventually dismantled it is recommended that the extruder be equipped with a removal device for the conveyor element.

The extruder is suitable for processing the most different types of viscous materials, thus for instance for extruding sludges, cellulose, meat masses, and particularly clay or clay-like materials.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
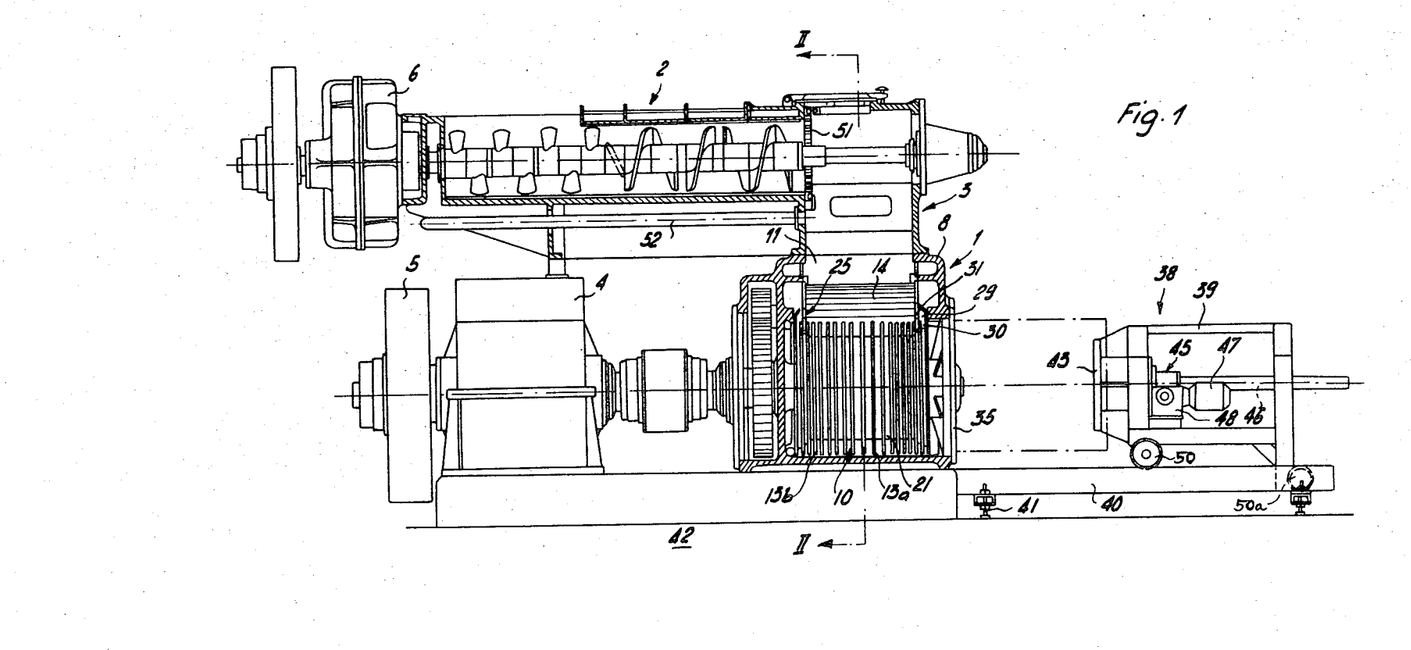
FIG. 1 is a partially longitudinal sectional view of a two-stage extruder or extrusion press, particularly suitable for the processing of clay materials.
Figure 2:
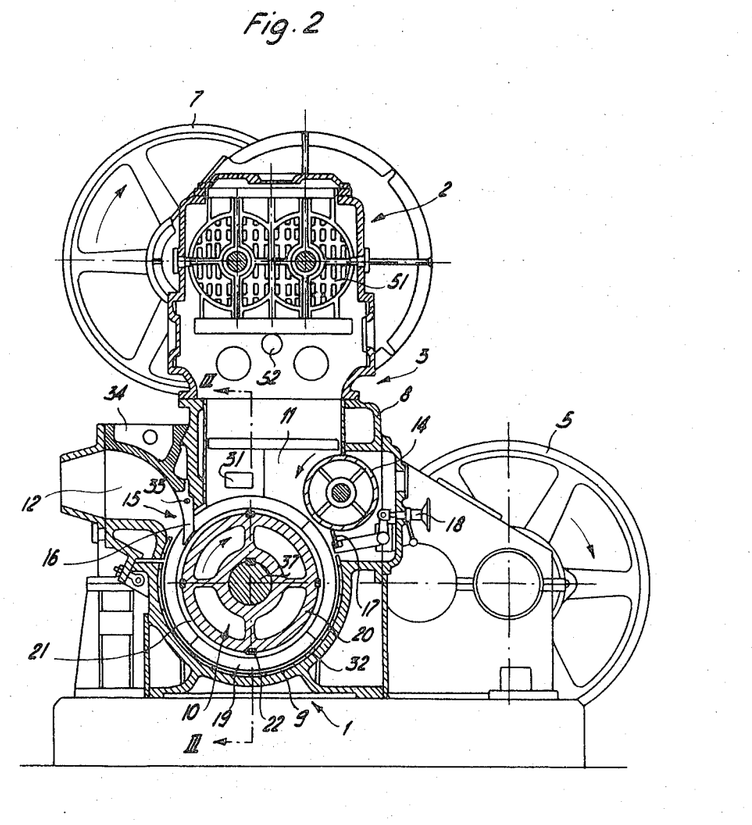
FIG. 2 is a cross-sectional view of the extruder of FIG. 1, taken substantially along the line II—II thereof.

Describing now the drawings, FIGS. 1 and 2 illustrate, by way of example, a two-stage extruder embodying a main extruder 1 and a pre-extruder 2 which are operatively inter-connected with one another by a connection channel 3. The connection channel 3, in the illustrated embodiment, is designed as a negative pressure chamber. The drive of the main or primary extruder 1 occurs through the agency of a transmission 4 which is operatively connected by means of a belt drive 5 with any suitable drive motor. In analogous fashion the pre-extruder 2, which in the embodiment under consideration is a worm extruder, is driven through the agency of a transmission 6 and belt drive 7.

The main extruder 1 embodies a housing 8 having a recess or compartment 9 for receiving a revolving or rotating conveyor element, which in the case under consideration is in the form of a conveyor drum 10. This housing 8 is also equipped with an inlet opening 11 and an outlet or discharge opening 12. As may be particularly clearly seen by referring to FIG. 3 the conveyor drum 10 is provided at its periphery with a number of projections 13 which continuously possess the same height. These projections 13 are of ring-shaped configuration, are distributed over the length of the conveyor drum 10, extend in the peripheral direction thereof practically up to the region of the housing wall. At the inlet opening 11 there is provided a rotating infeed roll or roller 14 which presses the infed material into the intermediate spaces 13' between the projections 13. At the outlet or discharge opening 12 there is arranged a stripper element designed in the form of a stripper comb 15. Comb 15 possesses claws 16 or other suitable protruding members which engage between the projections 13 and remove the material between the projections 13 of the conveyor drum 10.

Figure 3:
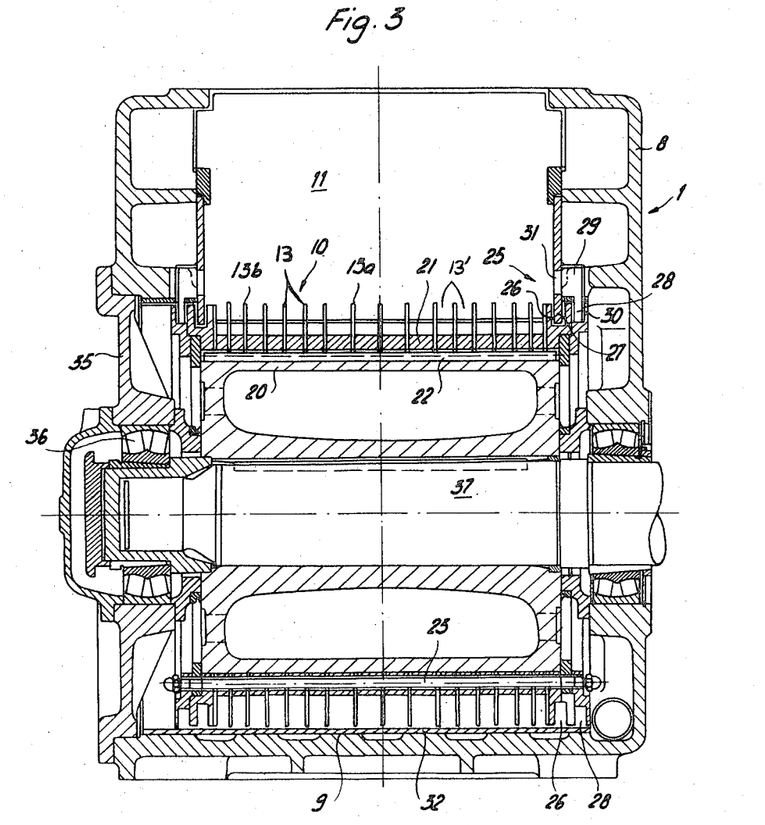
FIG. 3 is an enlarged vertical longitudinal sectional view of the second stage which forms the main extruder.

The infeed roller 14 possesses a smooth cylindrical surface and bears practically upon the ring-shaped projections 13. The region of the infeed roller or roll 14 located behind the contact location of the infeed roller 14 with the conveyor drum 10 is contacted by a stripper or scraper 17 which delivers the removed material to the conveyor drum. The scraper 17 can be adjusted with respect to the infeed roller 14 by means of an adjustment mechanism 18.

As particularly well recognized by referring to FIGS. 1 and 3 the ring-shaped or annular projections 13a of the central region of the conveyor drum 10 are arranged at a greater mutual spacing than the projections 13b of the outer regions. The ring-shaped projections 13a and 13b are formed by ring segments 19 which, in the embodiment under consideration, amount to one-quarter of a circle. These ring or ring-shaped segments 19 are arranged upon a support or carrier cylinder 20 and held in spaced relationship by the spacer rings 21. The ring segments 19 and the spacer rings 21 are secured against rotation at the support cylinder 20 by means of wedges or keys 22 or equivalent structure. The ring segments 19, forming the projections 13, together with the spacer rings 21 are held together by means of a clamping mechanism 23. In the embodiment under consideration this clamping mechanism 23 consists of a traction bolt which transversely pierces the ring segments and the spacer rings. The ring segments 19 of the projections are easily exchangeable and can be inter-changed with regard to one another. The same is also true for the spacer rings 21.

In contrast to the illustrated exemplary embodiment there can be employed instead of the ring or ring-shaped segments 19 also continuous rings and instead of the spacer rings also spacer ring segments. It would also be possible to form the projections 13a and 13b by turning or otherwise machining annular grooves in a cylinder.

The sides of the conveyor drum are sealed with respect to the housing by means of a sealing mechanism 25. This sealing mechanism 25 is preferably designed as a labyrinth seal and possesses an annular or ring-shaped groove 26 into which engages a ring-shaped or annular flange 27 of the housing. Disposed towards the outside of the ring-shaped groove 26 is a further ring-shaped groove 28 into which there can enter the material which has passed through the ring-shaped groove 26 protected by the ring-shaped flange 27. A return flow or recycling device 29 engages with the external ring-shaped groove 28 and which removes material which has possibly penetrated into the outer ring-shaped groove 28 by means of a scraper 30 and returns such through an opening 31 back into the inlet opening of the main press.

The recess or compartment 9 of the housing 8 is provided with a wear-resistant, exchangeable lining or covering 32 which protects the housing against wear.

The stripper or scraper comb 15 consists of individual claws or arms 16 which are held in spaced relationship by the spacer elements and at a spacing corresponding in each case to the thickness of the projections 13. Individual claws 16 are exchangeable and can be replaced when worn. The claws and the spacer elements are held together by a clamping mechanism 33 which, similar to the clamping mechanism 23 for the projections of the conveyor drum, is designed as a traction or tension bolt. The scraper or stripper comb is preferably arranged in such a manner that its penetration depth between the projections 13 is adjustable and re-adjustable. In this way it is possible to readjust within certain limits the stripper comb when it is worn.

The outlet opening 12 is formed by a housing portion 34 which can be opened and removed independent of the remainder of the housing 8. After opening such housing portion 34 the stripper comb 15 becomes accessible. The housing portion 34 can also be exchanged for other housing portions with different cross-sectional openings.

As best seen by referring to FIG. 3, the housing possesses a housing plate member 35 which covers the one end face of the recess or compartment 9 for receiving the conveyor drum 10. This housing plate member 35 carries the one bearing arrangement 36 for the support shaft 37 upon which there is arranged the conveyor drum 10. The housing plate member 35 is removable, so that it simultaneously withdraws the bearing arrangement 36 from the support shaft 37 and completely exposes the conveyor drum 10 so that such can be withdrawn from the support shaft.

The extruder is equipped with a removal or withdrawal mechanism 38 by means of which the conveyor drum 10 can be withdrawn from the support shaft 37, for instance for the purpose of exchanging worn projections 13 or worn spacer rings 21 or for equipping the conveyor drum with projections of different spacing combinations. The general arrangement of such withdrawal device 38 has been shown in FIG. 1 and the use thereof in FIG. 4.

Figure 4:
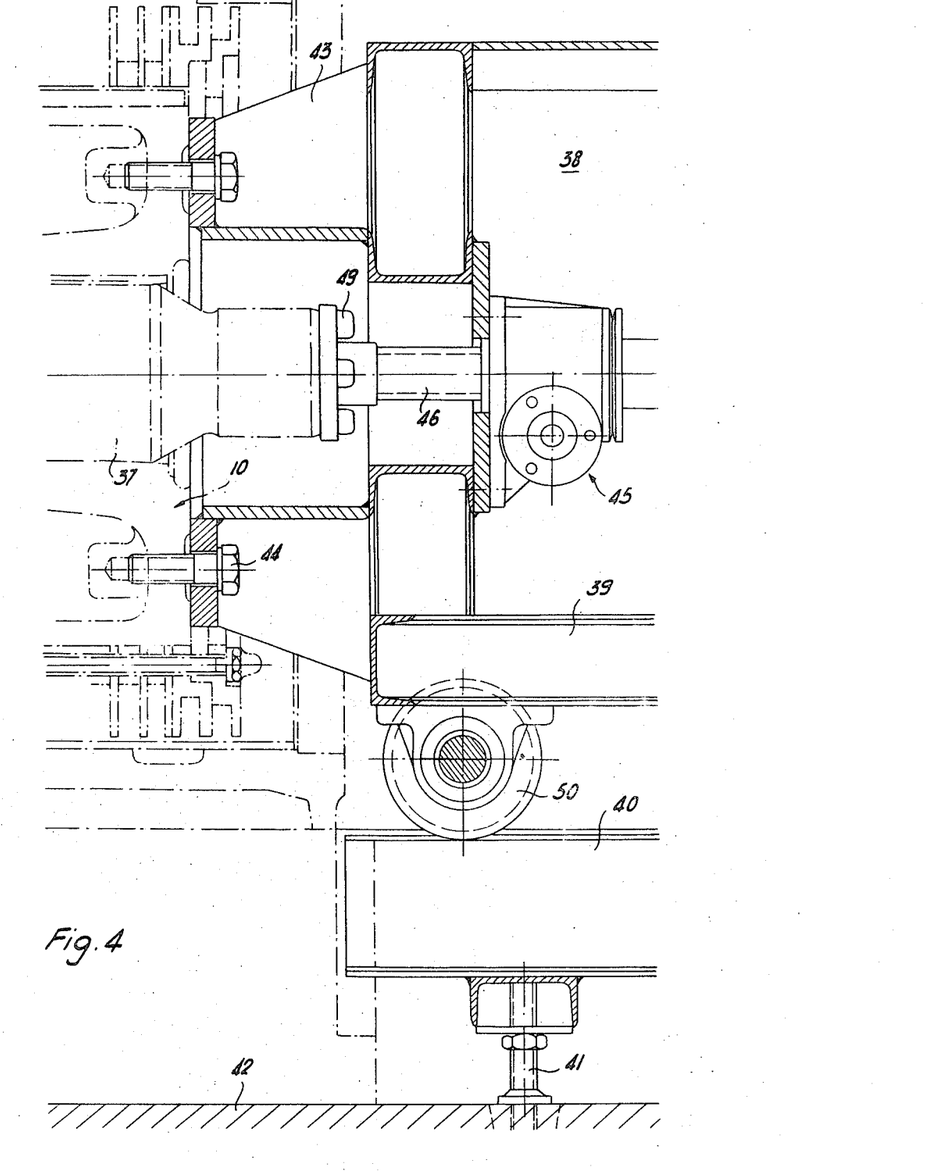
FIG. 4 is an enlarged vertical longitudinal sectional view of the removal device mounted at the conveyor drum.

This removal or withdrawal device 38 possesses a traveling carriage or frame 39 which bears upon rails 40 mounted via an adjustment mechanism 41 at the foundation 42. By means of the adjustment mechanism 41 it is possible to coaxially align the withdrawal device 38 with respect to the conveyor drum 10. The carriage 39 possesses a receiving head 43 which can be connected with the end face of the conveyor drum by means of attachment devices 44, in the present case screws. A drive mechanism 45 serves to move the carriage relative to the housing 8 of the extruder. In the embodiment under consideration the drive mechanism 45 contains a spindle 46 which is actuated by a spindle nut which, in turn, is moved by an electric motor 47 through the agency of a transmission 48. After exposing the conveyor drum and the support shaft the spindle 46 bears against the end face of the support shaft and is advantageously secured at that location by means of screws 49.

The carriage 39 of the withdrawal device or mechanism 38 is guided upon the rails by means of rollers 50 in such a way that, with the conveyor drum withdrawn, as schematically indicated in phantom lines in FIG. 1 it cannot tip over. To this end the rails are advantageously formed of a substantially C-shaped profile which is laterally open, and wherein the rear rollers 50a laterally engage into the associated C-shaped profile, so that the carriage is secured in vertical direction.

As already indicated above, for withdrawing the conveyor drum the housing plate member 35 at the end face of the extruder is removed, wherein at the same time there are removed also the bearing arrangement or bearing means 36 together with its removable bearing sleeve which is located upon the support shaft and then the conveyor drum 10, the support shaft 37, the recess or compartment 9 of the housing 8 for the conveyor drum and the lining 32 are completely exposed without any necessity for carrying out further manipulations. For withdrawing the conveyor drum 10 it is then necessary to remove from the inside of the machine at the sides of the drums the respective ring-shaped flange 27 and the scraper or stripper 30 of the associated seal arrangements 25, then the drum can be withdrawn via the withdrawal device. To this end the spindle 46 is initially introduced towards the end face of the support shaft 37 and secured by means of the screws 49. Thereafter the receiving head 43 is brought into contact with the end face of the conveyor drum and connected therewith by means of the attachment devices 44. After placing into operation the drive mechanism 45 the conveyor drum is withdrawn from the receiving or supporting shaft 37 and retained by the withdrawal device. After releasing the clamping mechanisms 23 the projections 13 and the spacer rings 21 can be exchanged. Assembly occurs in the reverse sequence.

With the conveyor drum removed it is also possible to exchange the lining 32 in the recess or compartment 9 of the housing 8.

In contrast to the exemplary illustrated embodiment of the invention it is also possible to carry out certain modifications as concerns the withdrawal device. Thus for instance it would be conceivable that the drive mechanism does not bear upon the support shaft 37, rather at the housing 8. Also it would be possible to equip the withdrawal mechanism or device with a mandrel which is located coaxially with respect to the support shaft 37 and possesses practically its external diameter, so that the conveyor drum can be guided over such mandrel. For withdrawing the drum there could be used spindles or other lifting devices which directly engage at the end faces of the conveyor drum. The withdrawal device can be supported at the support shaft through the agency of such mandrel.

As will be apparent by referring again to FIGS. 1 and 2 the extruder of the exemplary illustrated embodiment is designed as a two-stage unit. The first stage is formed by the preextruder 2 designed as a worm extruder and apart from carrying out a certain preparation of the material to be extruded produces a primary pressure. The pre-extruder 2 delivers the material through a grid plate 51 into the connection channel 3 which is connected through the agency of a suction line or conduit 52 with any suitable and therefore not particularly illustrated suction device. The connection channel or conduit 3 is thereby evacuated, producing a greater compaction of the material to be extruded. The thus pretreated material then arrives at the inlet opening 11 of the second stage of the extruder, that is to say the primary extruder, where the infeed roller or roll 14 facilitates entry of the material into the intermediate spaces between the projections 13 of the conveyor drum 10. The material is entrained by the projections 13 of the conveyor drum 10 and deflected via the stripper or scraper comb 15 into the outlet opening 12.

In contrast to the illustrated exemplary embodiment it would also be possible to advantageously construct the preextruder in like manner as the second stage, namely the primary extruder. When carrying out simple extrusion operations a single-stage extruder is also sufficient which, then, only embodies a primary or main extruder of the type illustrated.

Figure 5:
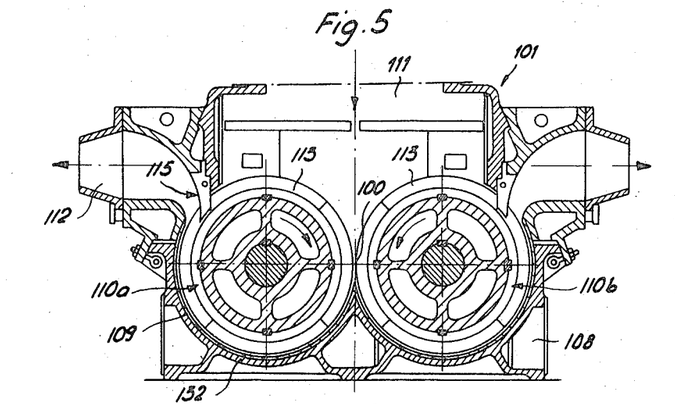
FIG. 5 illustrates an extruder with two adjacently arranged conveying drums having stripper combs and portrayed in the illustration according to FIG. 2.
Figure 6:
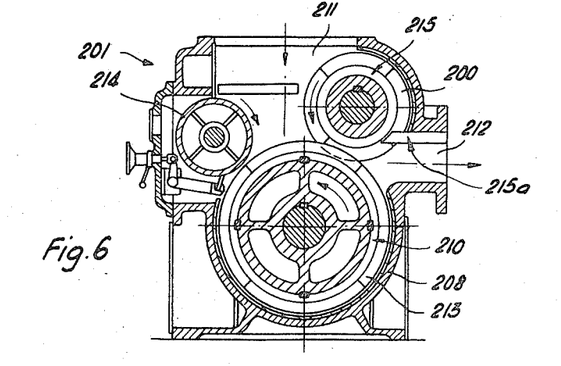
FIG. 6 illustrates an extruder with a conveyor drum and a stripper drum meshing therewith and in the illustration according to FIG. 2.
Figure 7:
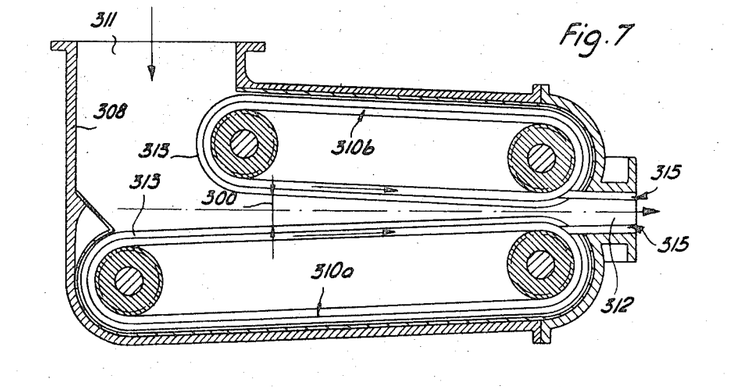
FIG. 7 illustrates an extruder with two cooperating conveyor bands and stripper combs in an illustration corresponding to FIG. 2.

FIGS. 5, 6 and 7 depict further exemplary embodiments of the extruder in which there are provided rotating conveyor elements (FIGS. 5 and 7) and a revolving conveyor element and a revolving stripper element (FIG. 6).

FIG. 5 illustrates the main press 101 of an extruder which is constructed analogous to the main press 1 of FIGS. 1 to 3, however in this instance possesses two revolving conveyor elements designed as conveyor drums 110a and 110b. The conveyor drums 110a and 110b are arranged to rotate in opposite directions in a compartment or recess 109 of a housing 108 and almost contact by means of their projections 113 at location 100. From this location the projections 113 slide in the peripheral direction along the lining 132 at the recess or compartment 109 and convey the material to two outlet openings 112, where it is removed in each instance by the scraper or stripper combs 115 from the intermediate spaces between the projections. The infeed of material occurs for both conveyor drums 110a and 110b by means of an inlet opening 111. There is dispensed with the infeed roll or roller of the main extruder 1 of FIGS. 1 to 3, inasmuch as its function is assumed by the mutually cooperating conveyor drums.

The main extruder 201 of FIG. 6 is designed analogous to the extruder construction of FIGS. 1 to 3, whereby however instead of using the scraper or stripper comb 15 there is provided a scraper or stripper drum 215 within housing 208 and which revolves in the same direction as the conveyor drum 210. The stripper or scraper drum 215 is likewise provided with projections 200 which, however, engage into the intermediate spaces between the projections 213 of the conveyor drum 210 and deflect the material conveyed in the intermediate spaces in the direction of the outlet opening 212. Material can also be removed from the intermediate spaces of the stripper drum by a stripper comb 215a. Just as was the case for the main extruder of FIGS. 1 and 3 here also there is arranged at the inlet opening 211 an infeed roller or roll 214 having a cylindrical jacket or outer surface.

FIG. 7 illustrates a further embodiment of main extruder 301 of an extrusion press incorporating two revolving conveyor elements designed as conveyor bands or belts 310a and 310b. Analogous to the above-described conveyor drums these conveyor bands are also equipped with projections 313. Both conveyor bands are arranged approximately horizontally in a housing 308, wherein one conveyor band 310a is located below and is longer than the other upwardly situated conveyor band 310b. The lower conveyor band 310a protrudes into the inlet opening 311 by means of a portion thereof which protrudes with respect to the upper conveyor band 310b. Both conveyor bands 310a and 310b are inclined at an angle 300 with respect to one another, the apex of which is located at the side of the common outlet opening 312. The conveyor bands move at their confronting sides or faces towards the outlet opening 312. Due to this arrangement of the conveyor bands the material is automatically entrained and additionally compacted and then delivered to the outlet or discharge opening 312. At that location there is provided for each conveyor band a scraper or stripper element designed as a scraper or stripper comb 315 for the withdrawal of the material.

It is within the possibilities of the inventive concepts to carry out a whole spate of further changes which, for instance, consist of a combination of features of the illustrated exemplary embodiments.

Therefore it would be possible, instead of the second conveyor band 310b of FIG. 7 to arrange a conveyor drum for opposite revolving movement, whereby there would be achieved a similar effect as with the second conveyor band. Furthermore, the embodiment of FIG. 7 could be equipped with two outlet openings similar to the arrangement of FIG. 5 or with the stripper or scraper elements of FIG. 6. Moreover, the conveyor drum 210 and the stripper drum 215 of FIG. 6 could be driven at different peripheral speeds. It is also possible to utilize a conveyor element as a stripper element for the other conveyor element. This could be the case for instance with the extruder of FIG. 7 if the projections of the conveyor band engage into the intermediate sapces of the other conveyor band and if the conveyor bands are moved in the direction opposite to the depicted direction. The extruders of FIGS. 5 to 7 can be equipped with a sealing device as well as with a withdrawal device similar to the extruder arrangements of FIGS. 1 to 4.

Due to the arrangement of the projections with different spacings at the conveyor element, in other words at the conveyor drum and/or the conveyor band, there is produced at the outlet opening an extremely uniform structure of the extruded material. Furthermore, the extruder, particularly when employing two conveyor elements, manifests itself through its very large output or capacity, which not only consists of its high discharge per unit of time and a lower power requirement per conveyed material unit, rather especially also in its insensitivity towards fluctuations in the structure and consistency of the material to be extruded. The extruder is equally suitable for materials possessing high moisture content as well as for materials of extremely low moisture content, that is to say almost dry materials. Clogging of the extruder does not practically occur.

The extruder constructions of this development are not only particularly insensitive to fluctuations in the characteristics or properties of the material which they are processing, but also can be very easily converted for handling different types of materials by changing the arrangement of the projections. By exchanging the housing portion possessing the outlet opening it is also possible in a very simple manner to alter the profile of the strand or extruded material to be produced. This is particularly possible since the conveyor element can be readily accommodated to the extruder characteristics which arise upon changing the profile of the extrusion or strand material which is to be produced.

While there is shown and described present preferred embodiments of the invention, it is to be distinctly understood that the invention is not limited thereto but may be otherwise variously embodied and practiced within the scope of the following claims. Accordingly,

What is claimed is:

1. An extruder for processing viscous materials, especially suitable for the processing of clay or clay-like materials, comprising a housing having an inlet opening and an outlet opening, a revolving conveyor element arranged in said housing, said conveyor element being provided at its periphery with a number of projections which are distributed over its length, said projections traveling in the peripheral direction and having essentially the same height, said projections extending almost up to the inner wall of the housing along at least a part of their peripheral movement, a scraper element arranged at the outlet opening for engaging into the intermediate spaces between the projections, said projections having a greater spacing from one another at the central region of the conveyor element than at the outer regions thereof.

2. The extruder as defined in claim 1, including a further revolving conveyor element cooperating with the first revolving conveyor element, said further revolving conveyor element likewise being provided at its peripheral surface with projections of essentially the same height and which travel in the peripheral direction.

3. The extruder as defined in claim 2, wherein the revolving conveyor element are of the same construction.

4. The extruder as defined in claim 2, wherein the further revolving conveyor element possesses a smaller peripheral length than the other revolving conveyor element.

5. The extruder as defined in claim 2, wherein the revolving elements possess the same direction of travel.

6. The extruder as defined in claim 2, wherein the revolving elements have opposite directions of travel.

7. The extruder as defined in claim 2, wherein the revolving conveyor elements possess the same peripheral velocity.

8. The extruder as defined in claim 2, wherein the revolving conveyor elements possess different peripheral velocities.

9. The extruder as defined in claim 2, wherein the revolving conveyor elements at least approximately contact one another by means of their projections.

10. The extruder as defined in claim 2, wherein each conveyor element has an outlet opening provided with a scraper element.

11. The extruder as defined in claim 2, wherein one conveyor element functions as a scraper element for the other conveyor element.

12. The extruder as defined in claim 2, wherein the conveyor elements comprise two band-like conveyor elements having confronting sides arranged at an angle with regard to one another, the apex of which confronts the outlet opening.

13. The extruder as defined in claim 12, wherein each band-like conveyor element has associated therewith a scraper element.

14. The extruder as defined in claim 1, wherein the scraper element is a rotatable component and possesses projections which extend in the peripheral direction and engage into the intermediate spaces between the projections of the conveyor element.

15. The extruder as defined in claim 1, wherein the revolving conveyor element possesses a substantially drum-shaped configuration.

16. The extruder as defined in claim 1, wherein the revolving conveyor element possesses a substantially band-like configuration.

17. The extruder as defined in claim 1, wherein the scraper element is constructed to possess a comb-like construction having individually exchangeable claws and spacer elements, a clamping mechanism for retaining the claws and spacer elements.

18. The extruder as defined in claim 1, wherein the scraper element is adjustable in its penetration depth between the projections of the conveyor element.

19. The extruder as defined in claim 1, wherein the spacing of the projections from the center of the conveyor element gradually decreases towards the outer portions thereof.

20. The extruder as defined in claim 1, wherein the spacing of the projections at the central region of the conveyor element amounts to 2.5 times the spacing of the projections at the outer regions thereof.

21. The extruder as defined in claim 20, wherein the spacing amounts to 1.5 times the spacing of the projections at the outer regions thereof.

22. The extruder as defined in claim 1, wherein the revolving conveyor element is a drum-like revolving conveyor element and the projections thereof are arranged upon a support cylinder, said projections being formed by ring-like members, said ring-like members being separated from one another by spacer elements, the spacer elements and the ring-like members being exchangeable and interchangeable, and a clamping mechanism for clampingly holding together the ring-like members and the spacer elements.

23. The extruder as defined in claim 22, wherein the ring-like members are ring elements.

24. The extruder as defined in claim 22, wherein the ring-like members are ring-shpaed segments.

25. The extruder as defined in claim 1, further including sealing means for sealing the ends of the revolving conveyor element towards the housing, and means for recycling material back into the inlet opening which penetrates through the sealing means.

26. The extruder as defined in claim 25, wherein the sealing means comprises a groove arranged at one end of the revolving conveyor element for receiving the throughpassing material, a scraper fixedly arranged at the housing engaging with said groove, said scraper having a delivery side which communicates via an opening with the inlet opening of the housing.

27. The extruder as defined in claim 1, further including an infeed roller having a substantially cylindrical outer peripheral surface arranged at the region of the inlet opening.

28. The extruder as defined in claim 1, wherein the housing possesses a compartment for receiving the conveyor element, said compartment having an exchangeable lining.

29. The extruder as defined in claim 1, further including suction means for evacuating the inlet side of the housing.

30. The extruder as defined in claim 29, wherein the suction means is connected at a conveyor channel between the pre-extruder and the main extruder.

31. The extruder as defined in claim 1, further including a pre-extruder arranged in front of said extruder.

32. The extruder as defined in claim 31, wherein the pre-extruder is of the same construction as the other extruder constituting a main extruder.

33. The extruder as defined in claim 1, further including a withdrawal mechanism for the revolving conveyor element which can be mounted at one end face of the conveyor element, said withdrawal mechanism comprising a traveling carriage having a receiving head for the conveyor element and a drive mechanism for moving the carriage relative to the housing.

34. The extruder as defined in claim 33, wherein the receiving head incorporates means for securing same to an exposed end face of the conveyor element.

35. The extruder as defined in claim 33, wherein the drive mechanism after exposing the conveyor element and a receiving portion thereof comprises a spindle bearing upon the receiving component which can be moved by a driven spindle nut.

36. The extruder as defined in claim 1, wherein the housing comprises a housing plate member for covering an end of a compartment receiving the conveyor element, said housing plate member carrying bearing means for a support shaft of the conveyor element and after removal thereof freely exposes the conveyor element and a receiving portion thereof.

37. An extruder for processing viscous materials, especially suitable for the processing of clay or clay-like materials, comprising a housing having an inlet opening and an outlet opening, a revolving conveyor element arranged in said housing, said conveyor element being provided at its periphery with a number of projections distributed over its length, said projections traveling in the peripheral direction and having substantially the same height, said projections extending almost up to the inner wall of the housing along at least part of their peripheral movement, a scraper element arranged at the outlet opening for engaging into the intermediate faces between the projections, and a further revolving conveyor element cooperating with the first revolving conveyor element, said further revolving conveyor element likewise being provided at its peripheral surface with projections of substantially the same height and which travel in the peripheral direction.

* * * * *